US009389592B1

(12) United States Patent
Baldwin et al.

(10) Patent No.: US 9,389,592 B1
(45) Date of Patent: Jul. 12, 2016

(54) TIMER ASSEMBLY WITH SLIM MOTOR

(71) Applicant: Reliance Controls Corporation, Racine, WI (US)

(72) Inventors: Jeffrey P. Baldwin, Phoenix, AZ (US); John Klein, Gilbert, AZ (US); Ryan Liebengood, Gilbert, AZ (US)

(73) Assignee: Reliance Controls Corporation, Racine, WI (US)

( * ) Notice: Subject to any disclaimer, the term of this patent is extended or adjusted under 35 U.S.C. 154(b) by 0 days.

(21) Appl. No.: 14/049,635

(22) Filed: Oct. 9, 2013

Related U.S. Application Data

(60) Provisional application No. 61/711,955, filed on Oct. 10, 2012.

(51) Int. Cl.

| | |
|---|---|
| ***H02K 41/02*** | (2006.01) |
| ***G04F 1/00*** | (2006.01) |
| ***H01H 7/08*** | (2006.01) |
| ***H01H 43/10*** | (2006.01) |
| ***H01H 43/00*** | (2006.01) |
| ***G04F 8/00*** | (2006.01) |
| ***G04C 23/16*** | (2006.01) |
| ***H01H 43/12*** | (2006.01) |
| ***G04C 23/10*** | (2006.01) |

(52) U.S. Cl.
CPC ................ *G04F 8/003* (2013.01); *G04C 23/10* (2013.01); *G04C 23/16* (2013.01); *H01H 43/00* (2013.01); *H01H 43/125* (2013.01)

(58) Field of Classification Search
CPC ........ G04C 23/00; G04C 23/10; G04C 23/16; H01H 43/00; H01H 43/125
USPC .......... 200/38 D, 38 R, 303, 307, 33 R, 38 A, 200/33 F, 38 F, 38 FA, 38 FB, 564; 307/112, 307/141; 310/12.18, 163, 413
See application file for complete search history.

(56) References Cited

U.S. PATENT DOCUMENTS

| | | | | | |
|---|---|---|---|---|---|
| 2,251,429 | A | * | 8/1941 | Swensen | 968/610 |
| 2,688,366 | A | * | 9/1954 | Morrison | 200/38 R |
| 2,886,106 | A | * | 5/1959 | Gallagher | G04C 23/16 200/38 FB |
| 2,898,993 | A | | 8/1959 | Huff | |
| 3,033,950 | A | | 5/1962 | Flegel | |
| 3,083,272 | A | * | 3/1963 | Stolle | G04C 23/16 116/308 |
| 3,096,408 | A | * | 7/1963 | Brock et al. | 200/38 B |
| 3,260,807 | A | * | 7/1966 | Rulseh et al. | 968/613 |
| 3,727,015 | A | * | 4/1973 | Voland et al. | 200/38 R |
| 4,311,886 | A | | 1/1982 | Rulseh | |
| 4,766,331 | A | * | 8/1988 | Flegel et al. | 307/141 |
| 4,810,897 | A | | 3/1989 | Shotey | |
| 4,822,964 | A | | 4/1989 | Koch | |
| 4,853,558 | A | | 8/1989 | Skarivoda | |
| 4,867,005 | A | * | 9/1989 | Voland | 200/38 R |

(Continued)

*Primary Examiner* — Amy Cohen Johnson
*Assistant Examiner* — Daniel Wicklund
(74) *Attorney, Agent, or Firm* — Boyle Fredrickson, S.C.

(57) ABSTRACT

A timer assembly is configured with a motor with slim construction so as to provide a thinner and more compact timer assembly. A timer assembly with a thinner profile and reduced thickness is achieved by incorporating the motor within the timer's baseplate. Additional advantages may be achieved by positioning the motor within an area defined by the baseplate and the time indicator, or by mounting the motor in an offset manner with respect to the baseplate. Further, the orientation of the motor may be changed to mount the motor to the front or rear of the baseplate to provide for an additional thickness reduction.

23 Claims, 15 Drawing Sheets

(56) References Cited

U.S. PATENT DOCUMENTS

| | | | | | |
|---|---|---|---|---|---|
| 5,266,841 | A | | 11/1993 | Flegel | |
| 5,329,082 | A | * | 7/1994 | Saarem | 200/38 D |
| 5,747,760 | A | | 5/1998 | Skarivoda | |
| D408,303 | S | | 4/1999 | Janda et al. | |
| D409,505 | S | | 5/1999 | Janda et al. | |
| D430,497 | S | | 9/2000 | Michaels | |
| D500,453 | S | | 1/2005 | Cullen et al. | |
| 8,415,573 | B2 | | 4/2013 | Lipp et al. | |
| D690,274 | S | | 9/2013 | Greaney | |
| 2002/0134654 | A1 | * | 9/2002 | Joyce et al. | 200/38 R |
| 2004/0090871 | A1 | * | 5/2004 | Amonett et al. | 368/97 |
| 2009/0230753 | A1 | * | 9/2009 | Breitfeld | H02K 7/116<br>297/463.1 |

* cited by examiner

TIMER ASSEMBLY WITH SLIM MOTOR

CROSS-REFERENCE TO RELATED APPLICATIONS

This application claims priority to U.S. provisional application Ser. No. 61/711,955, filed Oct. 10, 2012, the entire contents of which is incorporated herein by reference.

BACKGROUND OF THE INVENTION

1. Technical Field

The present invention relates generally to a timer used in commercial, industrial and residential applications, and more particularly, pertains to a timer with a slim motor assembly providing slim construction for said timing device.

2. Background Art

Timers are used for a variety of applications and purposes throughout commercial, industrial and residential buildings. Timers provide automated and adjustable control of electrical devices without having to be physically present to operate the device. Timers may be used for example, to control pools, water heaters, lights, or any other suitable electrical component. The timers may be electrically controlled or mechanically controlled, with the mechanical variety having several trippers which operate to turn on and off the electrical component at the desired time. Since a timer is adjustable, the control mechanisms must be accessible from wherever the timer is mounted. The timer enclosures are generally mounted to a wall, post or other structure nearby the electrical device they are meant to control.

The present invention seeks to improve upon the prior art by providing a timer having a motor with slim construction so as to provide a thinner and more compact timer assembly.

SUMMARY OF THE INVENTION

The present invention is generally directed to a timer in which a compact motor provides for a compact configuration of the timer. The compact motor is incorporated within a baseplate of the timer to achieve a thinner profile. Additional advantages may be achieved by positioning the motor within an area defined by the baseplate and a time indicator, or by mounting the motor in an offset manner with respect to the baseplate. Further, the orientation of the motor may be changed to mount the motor to the front or rear of the baseplate to provide for an additional thickness reduction.

In one embodiment, a mechanical timer assembly includes a baseplate having a front side and a back side; a time indicator extending from the front side; and a motor secured to the baseplate and having a front end, a back end, and an output gear; wherein the front end of the motor is forward of the front side of the baseplate and the back end of the motor is rearward of the back side of the baseplate.

In one aspect, the mechanical timer assembly baseplate may further include an opening for receiving the motor.

In another aspect, the baseplate may further include motor mounting openings that are positioned in the baseplate.

In another aspect, the mechanical timer assembly may include at least one intermediate gear communicating with the time indicator and the output gear.

In another aspect, the motor back end may extend beyond the output gear.

In another aspect, the motor front end may extend beyond the front side of the baseplate further than the motor back end extends beyond the back side of the baseplate.

In another aspect, the motor front end may extend beyond the front side of the baseplate a distance less than the motor back end extends beyond the back side of the baseplate.

In another aspect, the time indicator may be positioned on an opposite side of the baseplate from the motor output gear.

In another aspect, the motor may be releasably secured to the baseplate. The motor may further include a wiring quick disconnect.

In another aspect, the motor front end may not extend beyond the time indicator.

In another aspect, at least 25 percent of a motor thickness may extend beyond the front side of the baseplate, or at least 50 percent of a motor thickness may extend beyond the front side of the baseplate.

In another aspect, the motor may further include at least one mounting tab to secure the motor to the baseplate. The at least one mounting tab may be a series of mounting tabs.

In another aspect, the at least one mounting tab may be positioned between the motor front end and the motor back end. The at least one mounting tab may be positioned halfway between the motor front end and the motor back end.

In another embodiment, a mechanical timer assembly includes a baseplate having a front side and a back side; a time indicator extending from the front side; and a motor secured to the baseplate and having a front end, a back end, and an output gear. The motor front end is rearward of the back side of the baseplate and the motor back end is forward of the front side of the baseplate.

In another aspect, the baseplate may further include an opening for receiving the motor.

In another aspect, the baseplate may further include motor mounting openings, and the motor mounting openings may be positioned in the baseplate. The motor further includes at least one mounting tab to secure the motor to the motor mounting openings.

In another aspect, the motor back end may extend beyond the output gear.

In another aspect, the time indicator may be positioned on an opposite side of the baseplate from the motor output gear.

In another aspect, the motor may not extend beyond the time indicator.

In another aspect, at least 25 percent of the motor thickness may extend beyond the front side of the baseplate.

In another aspect, the motor may further include at least one mounting tab positioned between the front end and the back end. The at least one mounting tab may be positioned halfway between the motor front end and the motor back end.

Various other features, objects and advantages of the present invention will be apparent from the following detailed description taken together with the drawings.

BRIEF DESCRIPTION OF THE DRAWINGS

The drawings illustrate the best mode presently contemplated for carrying out the invention.

In the drawings.

DETAILED DESCRIPTION OF THE DRAWINGS

Figure 1:
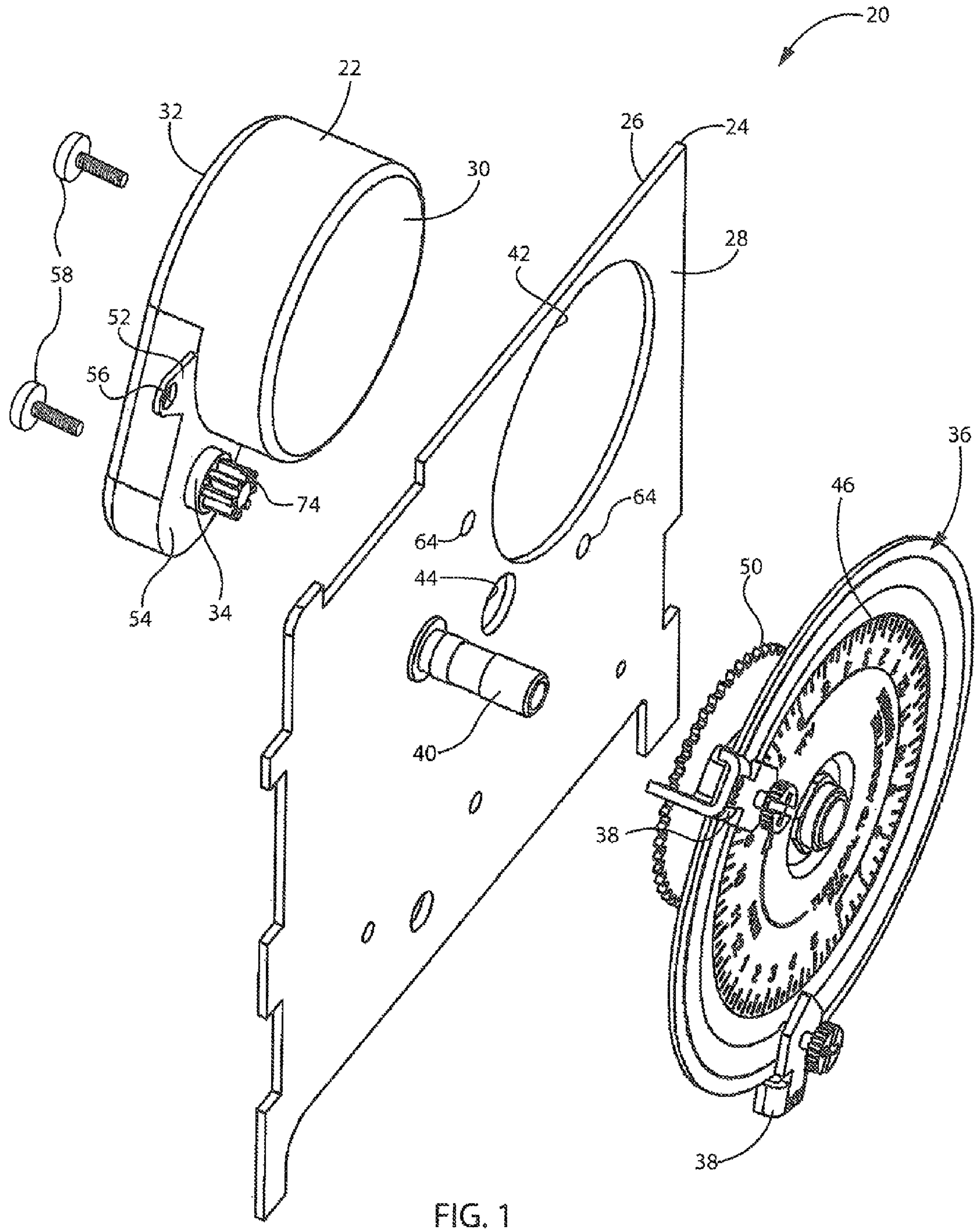
FIG. 1 is an exploded isometric view of a timer assembly in accordance with the present invention, having a motor mounted to a back side of a baseplate and a timer extending from a front side of the baseplate.

This invention relates to a timer assembly having a motor with a compact configuration.

FIGS. 1 through 6 illustrate various views of a mechanical timer assembly 20 with a motor 22 positioned on a baseplate 24, and more particularly, with the motor 22 positioned on a back side 26 of the baseplate 24. The baseplate 24 includes a front side 28 opposite the back side 26. The motor 22 includes a front end 30, a back end 32, and an output gear 34. A time indicator 36 is positioned so as to extend from the base plate's front side 28 and may include a number of timer triggers 38 for activating a connected device (not shown).

As best seen in FIG. 1, the baseplate front side 28 may include a shaft 40 extending therefrom for receiving the time indicator 36. The baseplate 24 may further include an opening 42 for receiving the motor 22 and an aperture 44 for receiving the output gear 34. The baseplate 24 may be in the form of a piece of sheet metal having the openings and apertures formed by stamping operations and welding the shaft 40 on the front side 28, or alternatively by using screws or bolts (not shown) to mount the shaft 40 to the baseplate 24, although it is understood that any other satisfactory material, forming method and construction may be employed.

Figure 4:
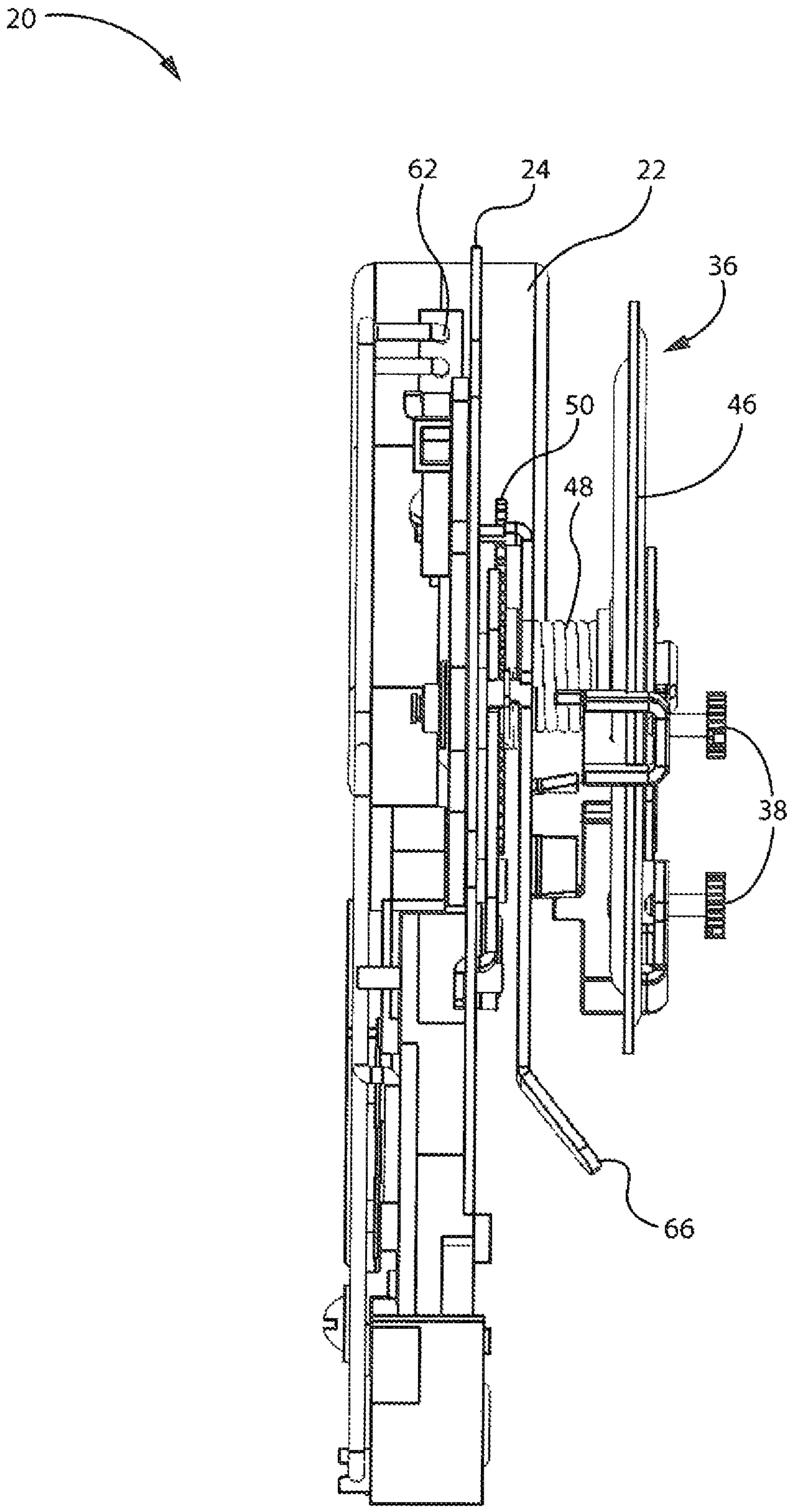
FIG. 4 is a side elevation view of the timer assembly of FIG. 2.
Figure 5:
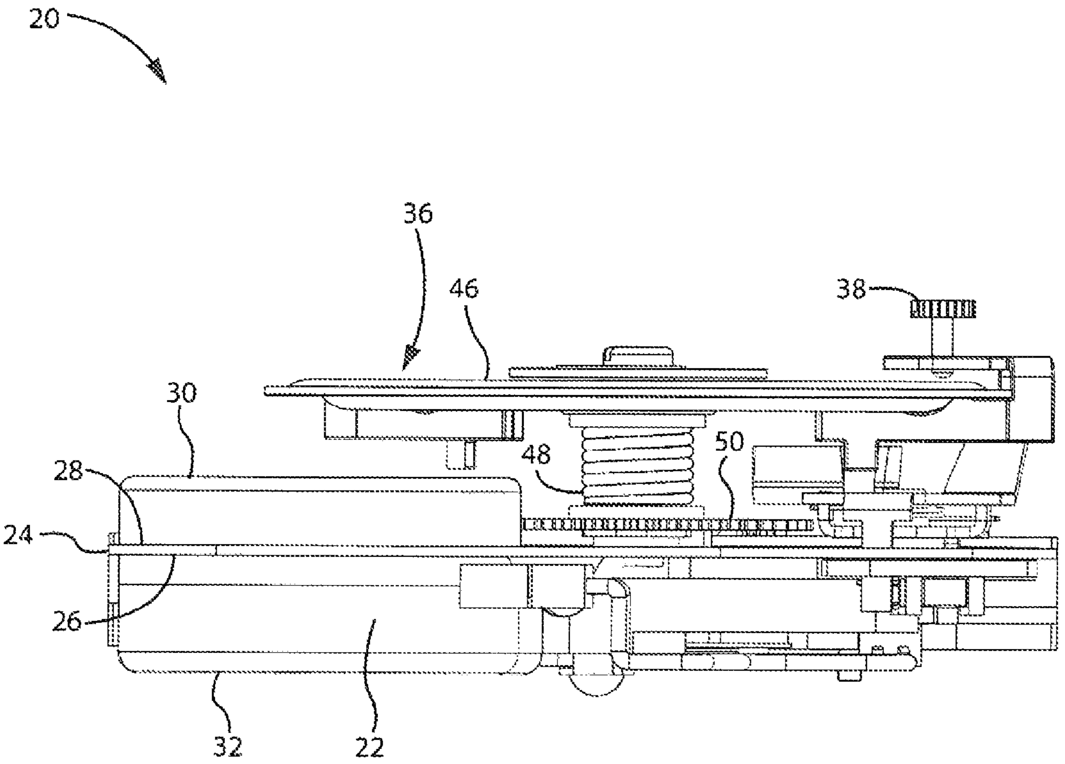
FIG. 5 is a top plan view of the timer assembly of FIG. 2.
Figure 6:
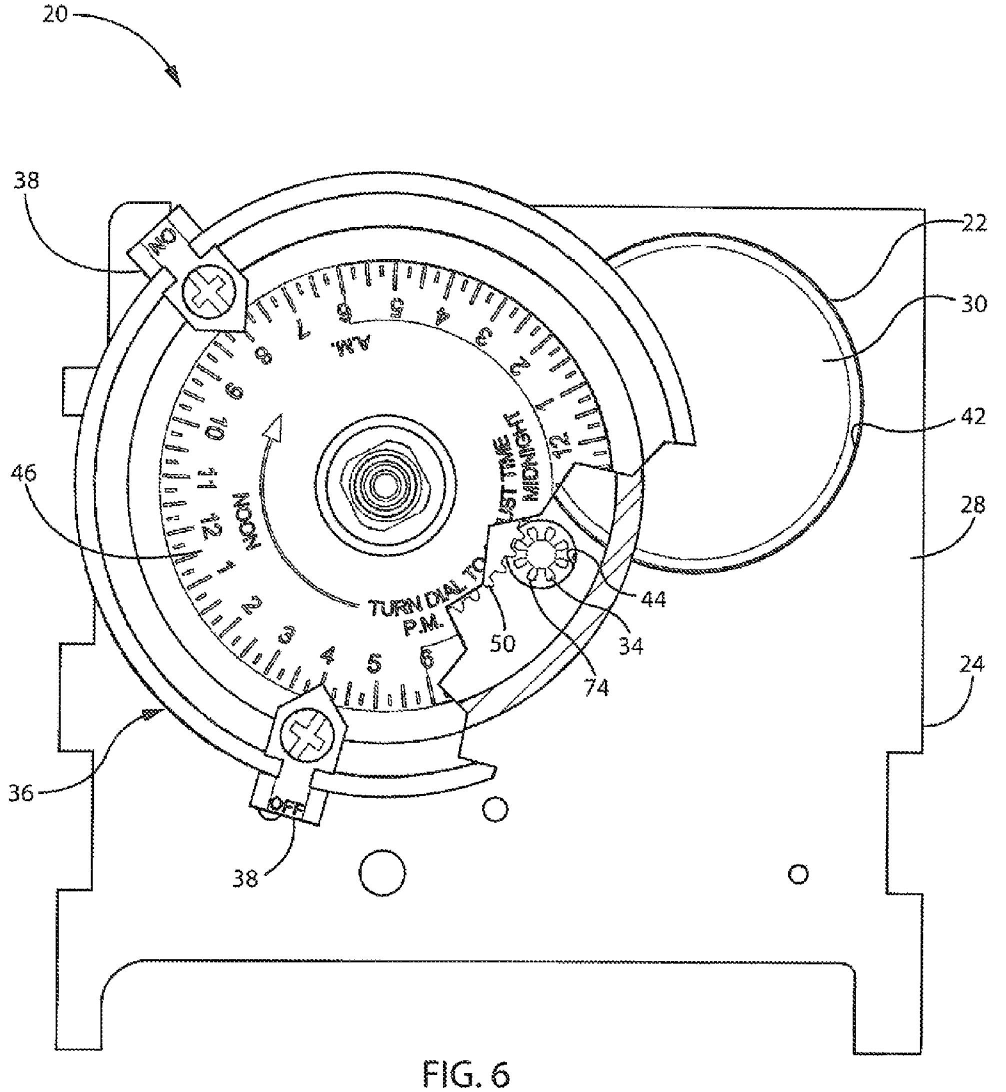
FIG. 6 is an enlarged front elevation view of the timer assembly of FIG. 2 with a portion of the timer assembly removed to illustrate the interaction between an output gear and an intermediate gear.
Figure 7:
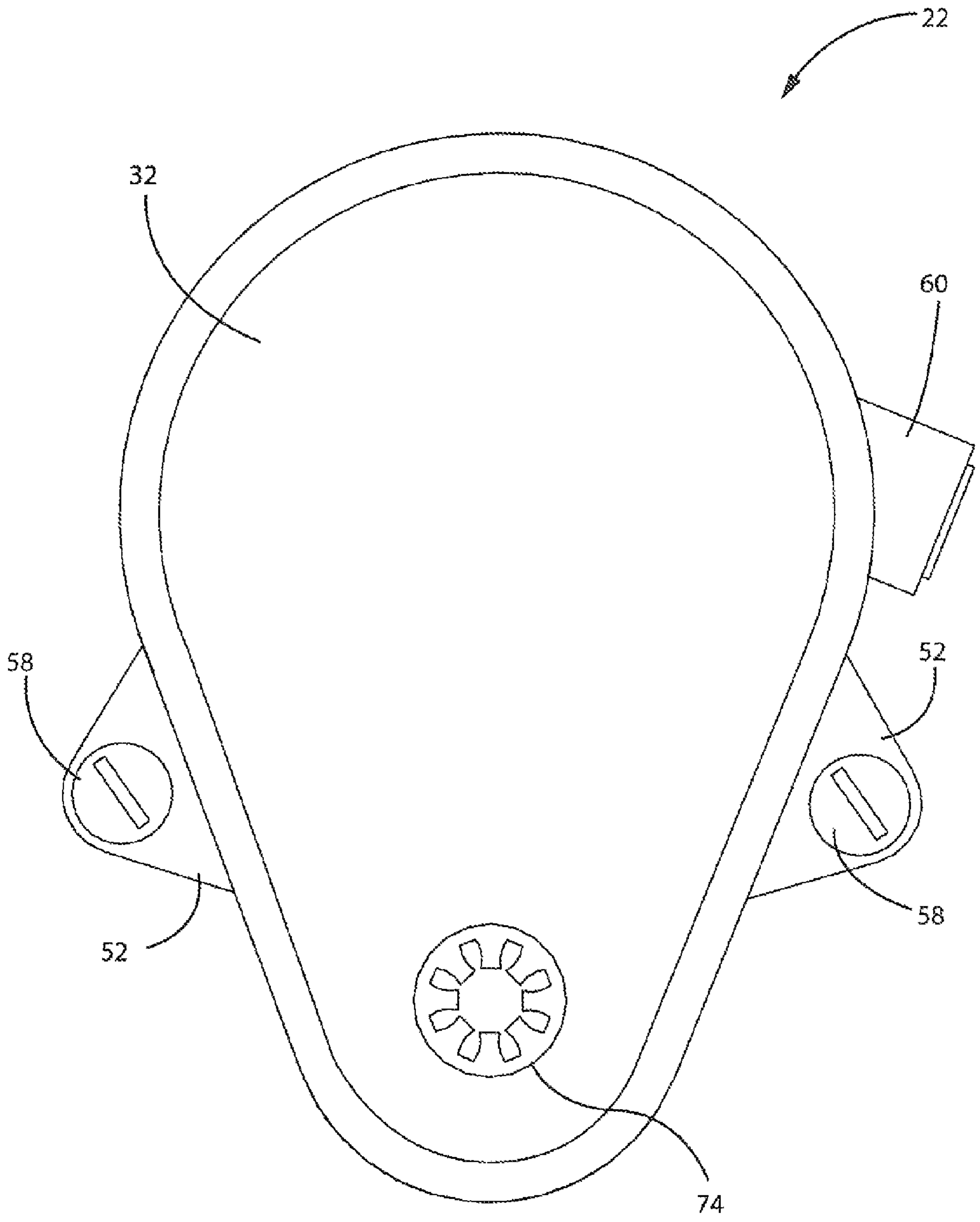
FIG. 7 is a front elevation view of a timer assembly motor with screws within the mounting openings.
Figure 8:
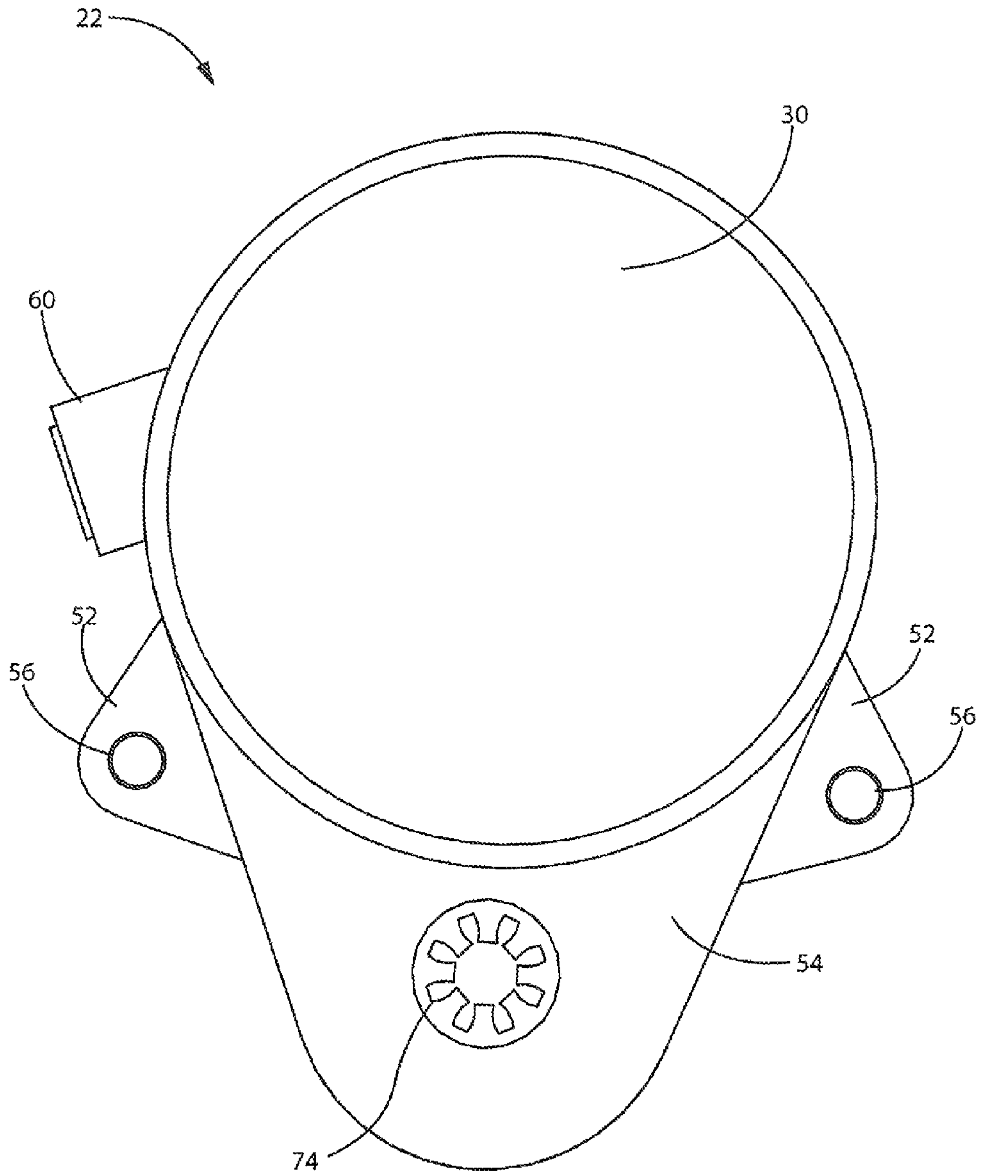
FIG. 8 is a rear elevation view of the timer assembly motor of FIG. 7 with the screws removed from the mounting openings.
Figure 9:
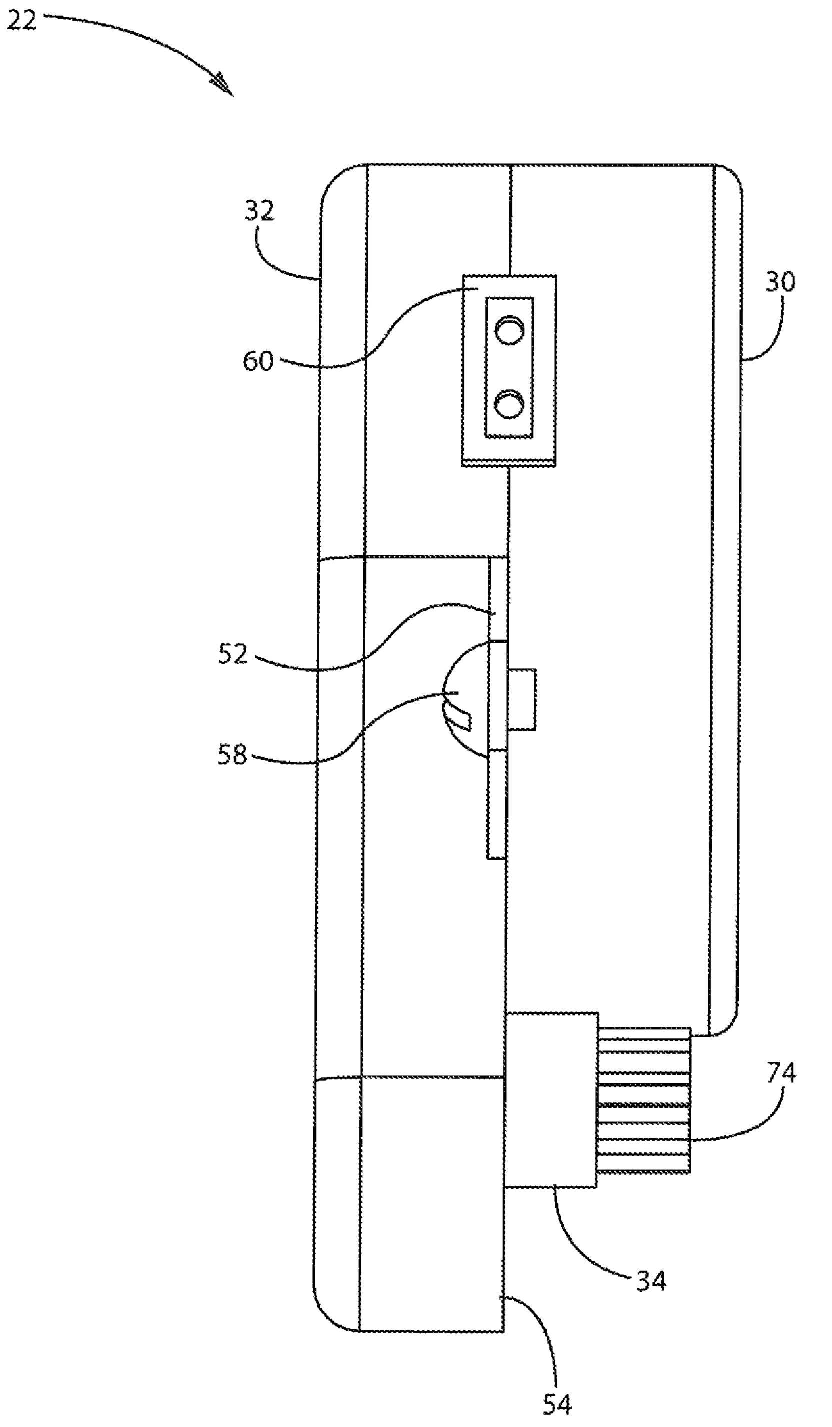
FIG. 9 is a side elevation view of the timer assembly motor of FIG. 7.
Figure 10:
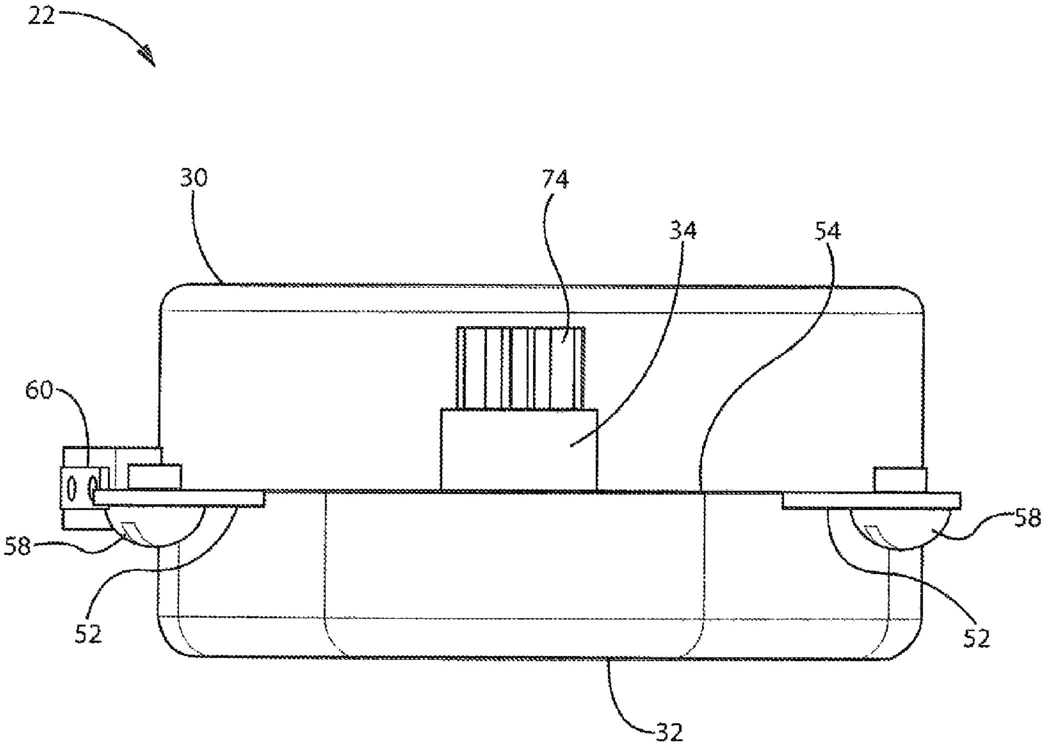
FIG. 10 is a top plan view of the timer assembly motor of FIG. 7.
Figure 11:
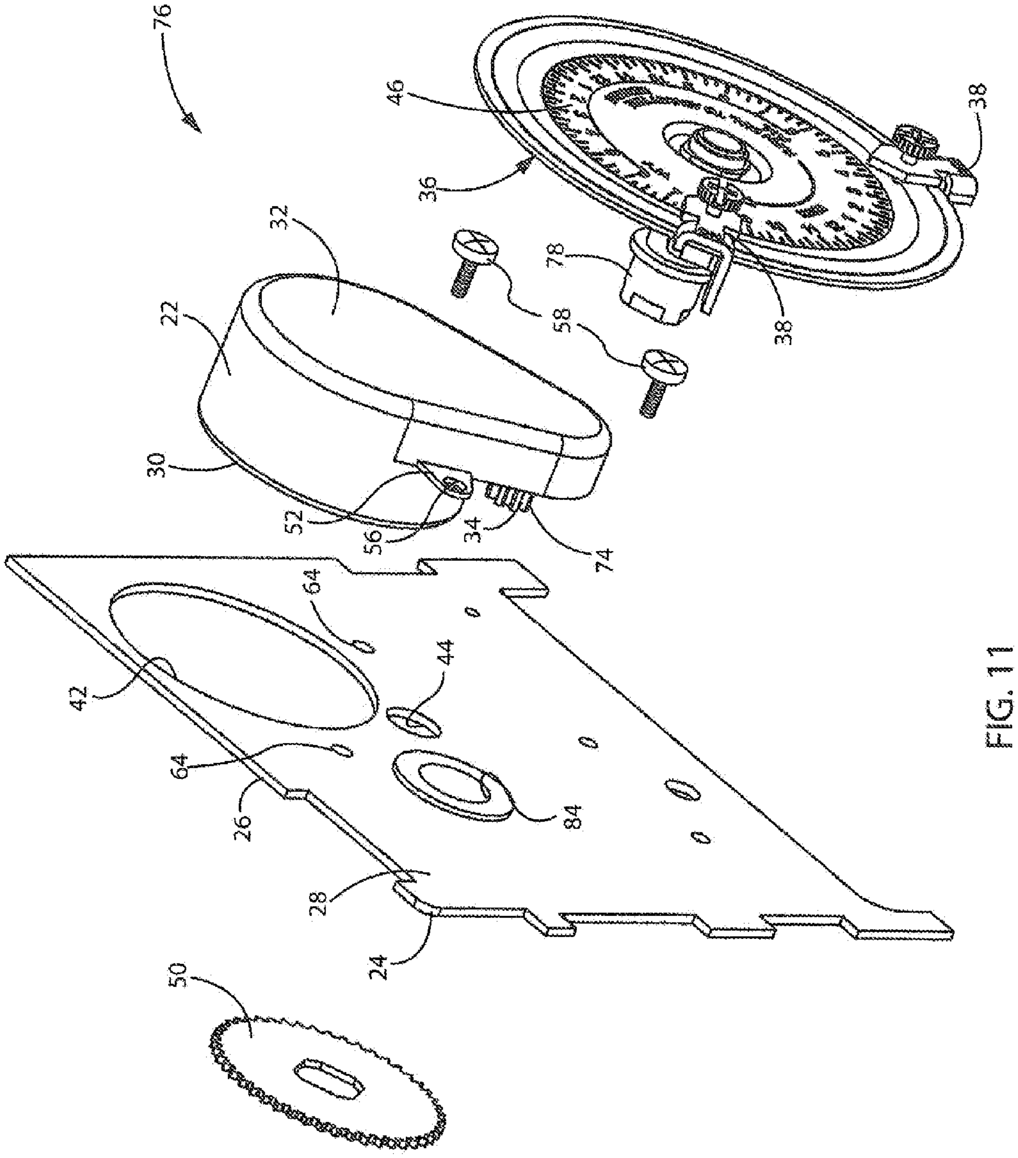
FIG. 11 is an exploded isometric view of an alternative embodiment of a timer assembly in accordance with the present invention with a motor mounted to a front side of the baseplate and a timer extending from a front side of the baseplate.
Figure 12:
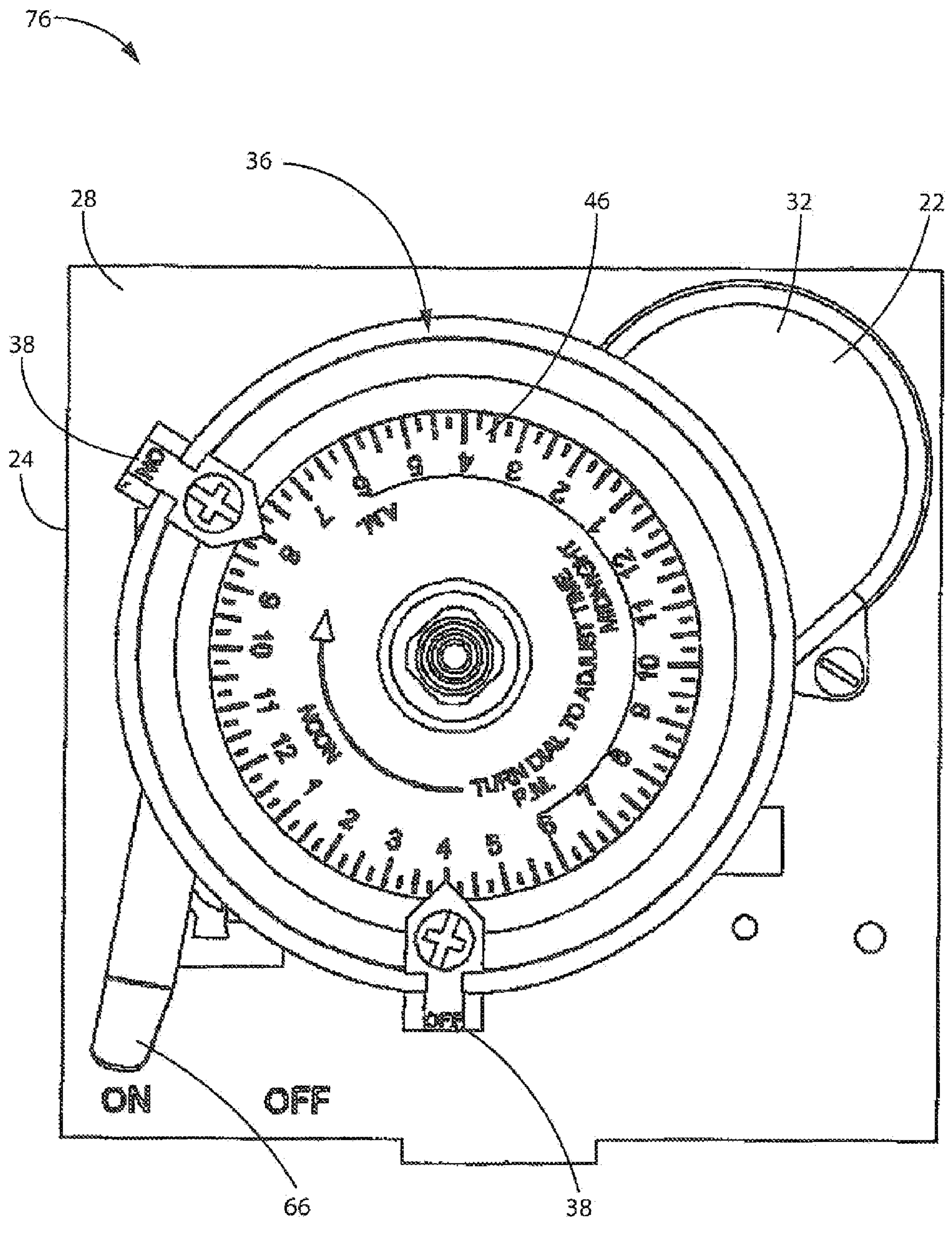
FIG. 12 is a front elevation view of the timer assembly of FIG. 11.
Figure 13:
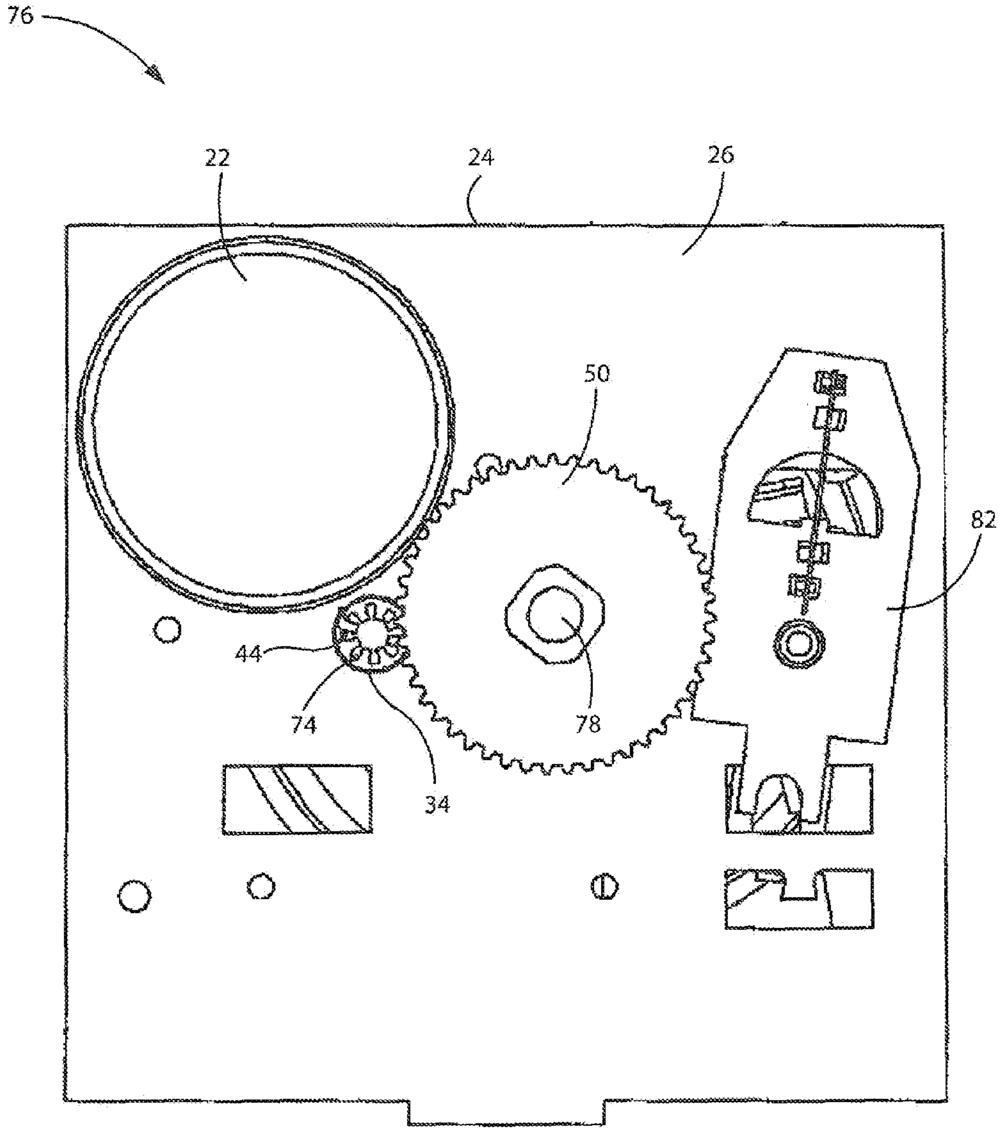
FIG. 13 is a rear elevation view of the timer assembly of FIG. 12.
Figure 14:
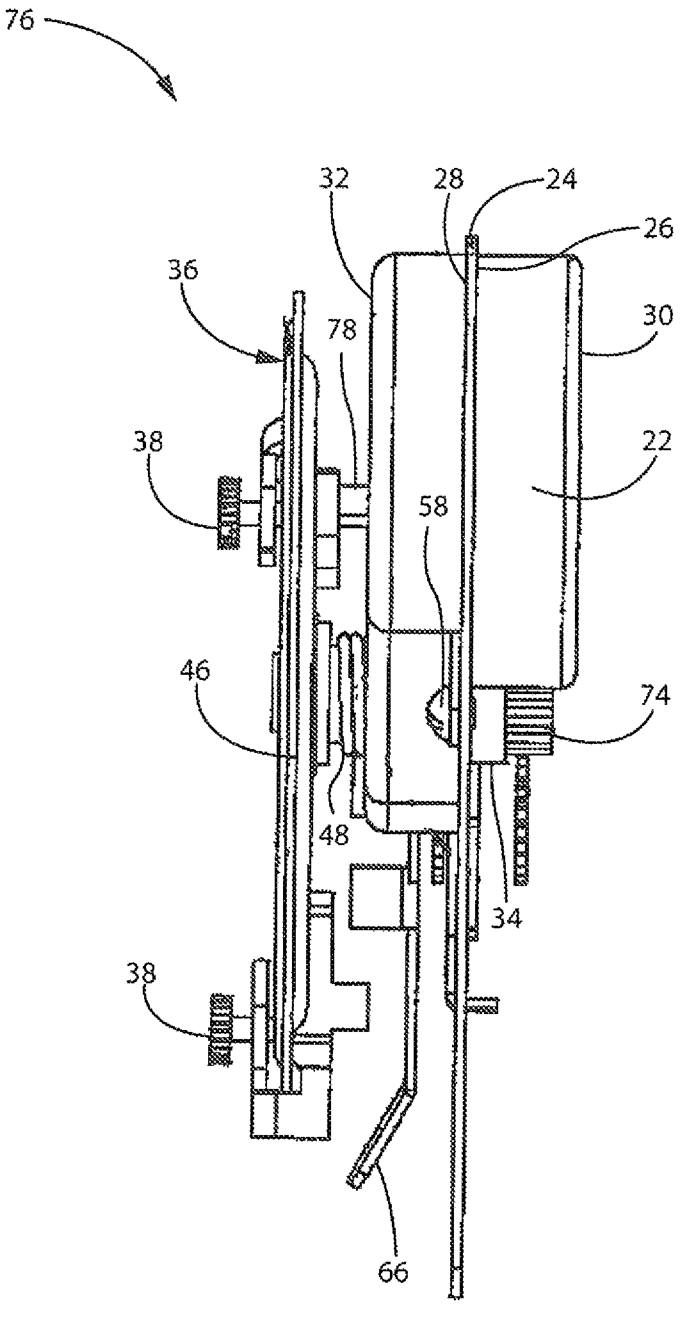
FIG. 14 is a side elevation view of the timer assembly of FIG. 12.

The time indicator 36 includes a time wheel 46 having a series of time markers for determining both the current time and where to place timer triggers 38 to activate a connected device. As seen in FIGS. 4 and 5, the time indicator 36 may also include a spring 48 for biasing the time indicator 36 away from the baseplate front side 28 when the time indicator 36 is engaged with the motor 22. The spring 48 may be compressed to permit the user to manually adjust the time indicator 36. Specifically, an intermediate gear 50 connects the time indicator 36 to the motor 22 through the motor output gear 34 during operation. When the time indicator 36 is pushed inwards to compress the spring 48, the intermediate gear 50 is no longer engaged with the output gear 34 and the time indicator 36 and the time wheel 46 may be manually adjusted. When the user releases the time indicator, the spring 48 decompresses and the intermediate gear 50 is once again engaged with the output gear 34.

Figure 3:
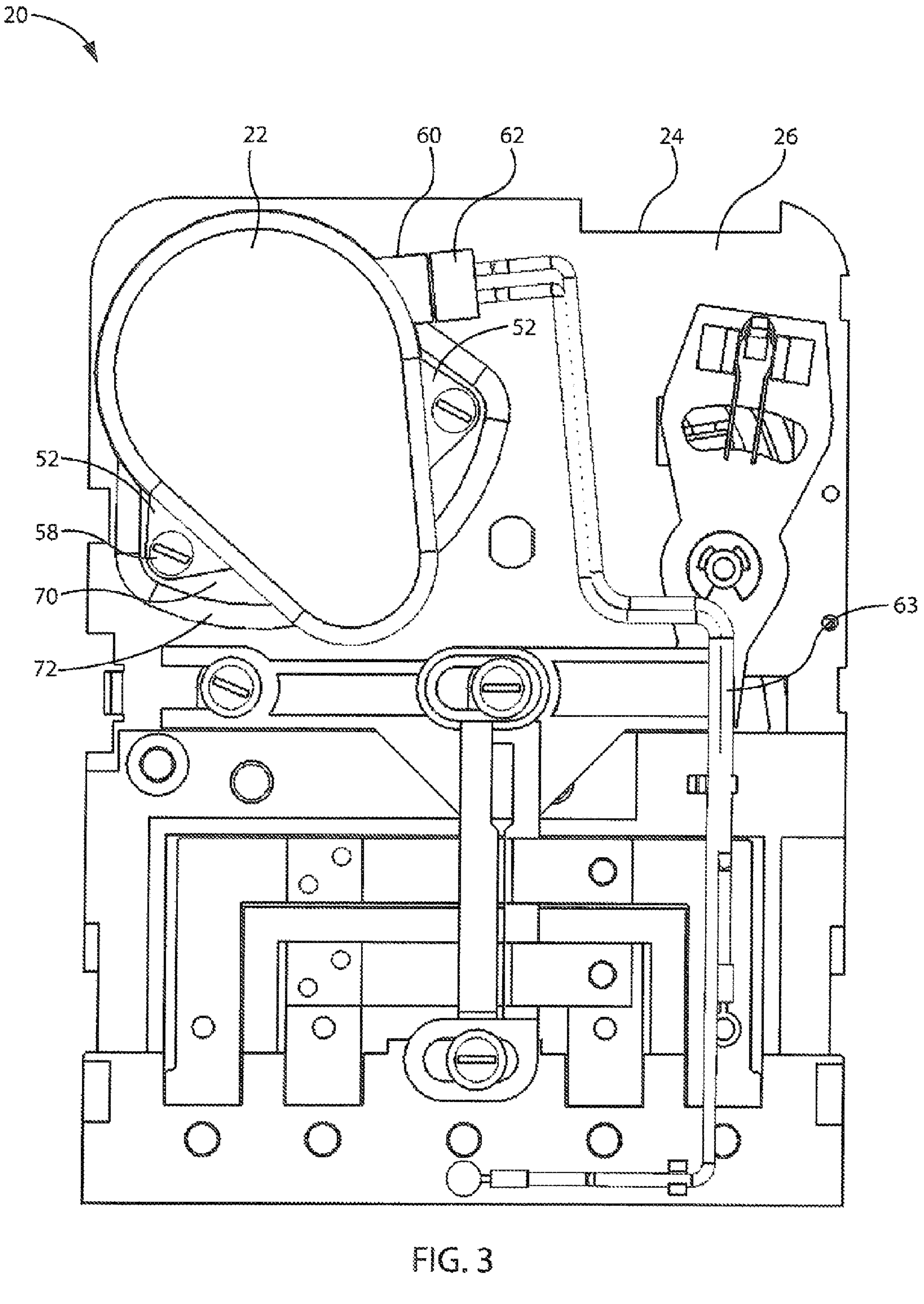
FIG. 3 is a rear elevation view of the timer assembly of FIG. 2 and having a motor mounting area offset from the back side of the baseplate.

Referring now to FIG. 1 and FIG. 3, the motor 22 may include a pair of motor mounting tabs 52 extending from a ledge 54 which mounts the motor output gear 34 thereon. Each motor mounting tab 52 includes a mounting opening 56 for receiving mounting screws or bolts 58. The motor mounting tabs 52 are positioned between the motor front end 30 and the motor back end 32 and are generally positioned halfway between the front end 30 and the back end 32. In additional implementations, the motor mounting tabs 52 may be positioned closer to the front end 30 or the back end 32 as may be appropriate. While two motor mounting tabs 52 are shown and described, any suitable number of motor mounting tabs may be incorporated, including just a single motor mounting tab, and the motor mounting tabs 52 may take any variation of shapes or sizes without departing from the spirit and scope of the present disclosure as one of skill in the art will immediately appreciate.

Referring now to FIG. 3, the motor 22 may also include a wiring quick disconnect 60 for receiving a wiring connector 62 coupled to the wiring 63 to provide power to the motor 22. The wiring quick disconnect 60 is helpful to permit easy disconnection of the motor electrical power as well as to permit simple reconnection after repairing or replacing the motor 22. Accordingly, a user may easily replace the motor 22 by disconnecting the wiring connector 62 from the wiring quick disconnect 60 and removing the screws 58 from the motor mounting tabs 52, and particularly, removing the screws 58 from the mounting openings 56 and baseplate motor mounting tab openings 64 in the baseplate 24.

Figure 2:
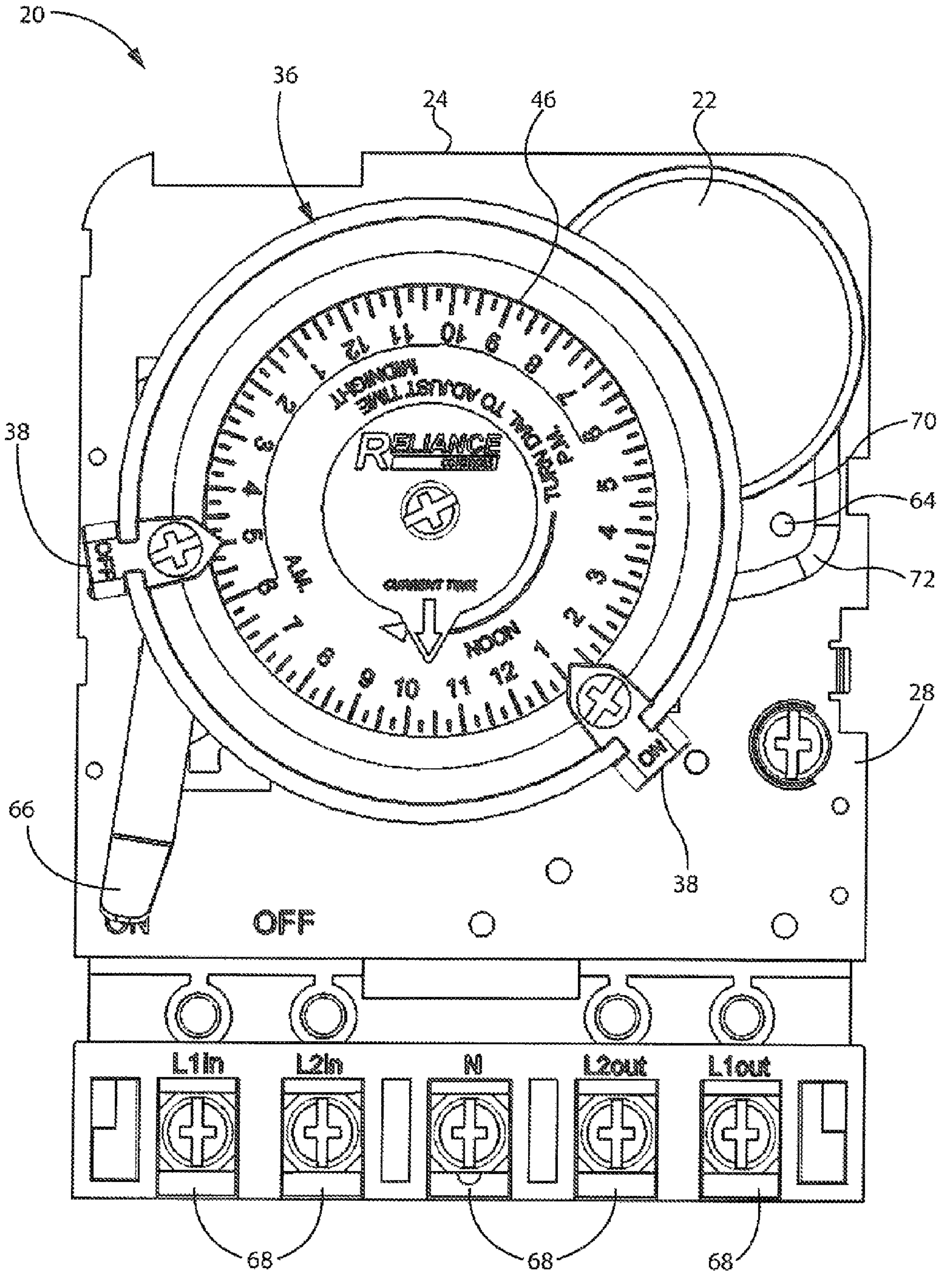
FIG. 2 is a front elevation view of the timer assembly of FIG. 1 showing wiring terminals for connecting line inputs.

While the motor mounting tab openings 64 are illustrated as being integral with the baseplate 24, as seen in FIGS. 1 and 2, it is within the spirit and scope of the present invention to include motor mounting tab openings 64 which are removably connected to the baseplate 24 or are offset from the baseplate 24 so as to define the relative position of the motor 22 with respect to the baseplate 24, as further described below. Further, the motor mounting tab openings 64 may be threaded to accept motor mounting screws 58 to ensure that the motor 22 is easily and efficiently removably secured to the baseplate 24.

In one embodiment, the location of the motor 22 is determined by the relative position between the motor mounting tabs 52 and the motor mounting tab openings 64 in baseplate 24. Specifically, the location of the motor mounting tabs 52 between the motor front end 30 and back end 32 in combination with any offset of the motor mounting tab openings 64 determines the relative position of the motor 22 with respect to the baseplate 24.

Referring to FIGS. 1 through 6, the motor front end 30 extends forward of the baseplate front side 28, while the motor back end 32 extends rearward of the baseplate back side 26. In another embodiment, the motor front end 30 extends forward of the baseplate front side 28 more than the extent in which the motor back end 32 extends rearward of the baseplate back side 26. In still another embodiment, the motor front end 30 extends forward of the baseplate front side 28 less than the extent in which the motor back end 32 extends rearward of the baseplate back side 26. As can be seen, the motor 22 may be positioned so that the motor front end 30 does not extend beyond the time indicator 36 to advantageously reduce the overall size of the timer assembly 20. Specifically, the overall thickness or depth of the timer assembly 20 may be reduced by positioning the motor 22 forward as much as possible while maintaining the motor front end 30 even with or behind the time indicator 36 to further reduce the overall thickness of the timer assembly 20. In any of the implementations shown, the thickness or depth of the motor 22 may extend any suitable amount forward or rearward of the baseplate 24, including greater than 25 percent, greater than 50 percent, or any other suitable amount to assist with reducing the overall thickness of the timer assembly 20.

Operation remains similar to other mechanical timer assemblies, whereby the timer triggers 38 contact various actuating components to turn the connected device on or off as desired. Further, a manual override switch 66 may be incorporated to override the timing function. Further, the override switch 66 may move to the appropriate location (on or off) during regular timing operations to further indicate the timer assembly's current state. Finally, the timer assembly 20 also includes wiring terminals 68 for connecting line inputs as well as the connected device for operation. Thus it is seen that the motor 22 may be moved relative to the baseplate 24 and particularly positioned at least partially within the baseplate 24 to significantly reduce the overall thickness of the timer assembly 20.

Referring to FIGS. 1-3 in particular, two versions of the baseplate 24 are shown. FIG. 1 illustrates the baseplate 24 having a front side 28, an opening 42, and motor mounting tab openings 64. The motor mounting tab openings 64 are incorporated within the front side 28 so that the motor mounting tabs 52 of the motor 22 are parallel or nearly flush with the front side 28 or back side 26. In contrast, FIGS. 2-3 illustrate baseplate 24 having a recessed motor mounting area 70. In particular, motor mounting area 70 is offset from the baseplate back side 26 by an angled portion 72. The angled portion 72 may be arranged to offset the motor mounting area 70 from the back side 26 either forwards or backwards a desired distance depending on the desired offset positioning of the motor 22. Accordingly, a variety of mounting orientations may be utilized to assist with positioning the motor 22 in an appropriate location with respect to the baseplate 24 to better optimize the overall thickness of the timer assembly 20.

FIGS. 7 through 10 illustrate various enlarged views of the motor 22. The motor 22 generally includes a back end 32 and a front end 30, with an output gear 34 extending from either side. The output gear 34 may be offset from the front end 30 or back end 32 and may extend from the ledge 54. The output gear 34 may also include a series of teeth 74 arranged to engage either the intermediate gear 50 or the time indicator 36 as may be appropriate. The motor 22 may also incorporate a wiring quick disconnect 60 for easier and more efficient replacement or repair of the motor.

As discussed above, the motor 22 includes at least one motor mounting tab 52 with a mounting opening 56 for receiving screws 58. In one embodiment, at least two motor mounting tabs 52 are included, each having their own mounting openings 56. Motor mounting tabs 52 may extend from the ledge 54 or may be disposed at any position between the motor front end 30 and the motor back end 32. In alternative embodiments, the motor mounting tabs 52 are flush with the front end 30 or back end 32 and are incorporated with the recessed motor mounting area 70 as described in greater detail above. Further, the motor back end 32 may extend outward beyond the output gear 34 to prevent damage to the output gear or teeth 74 both during operation and assembly.

Referring now to FIGS. 11 through 15, an alternative embodiment of a timer assembly 76 is shown in greater detail. The timer assembly 76 is similar in function and appearance to the timer assembly 20, with one notable difference. Specifically, the timer assembly 76 reverses the orientation of the motor 22 such that the output gear 34 extends rearward from the baseplate 24 and contacts an intermediate gear 50 on a back side of baseplate 24. When the motor output gear 34 contacts the intermediate gear 50 on the back side 26 of baseplate 24, the time indicator 36 is rotated through the shaft 78 with the spring 48 thereon.

Figure 15:
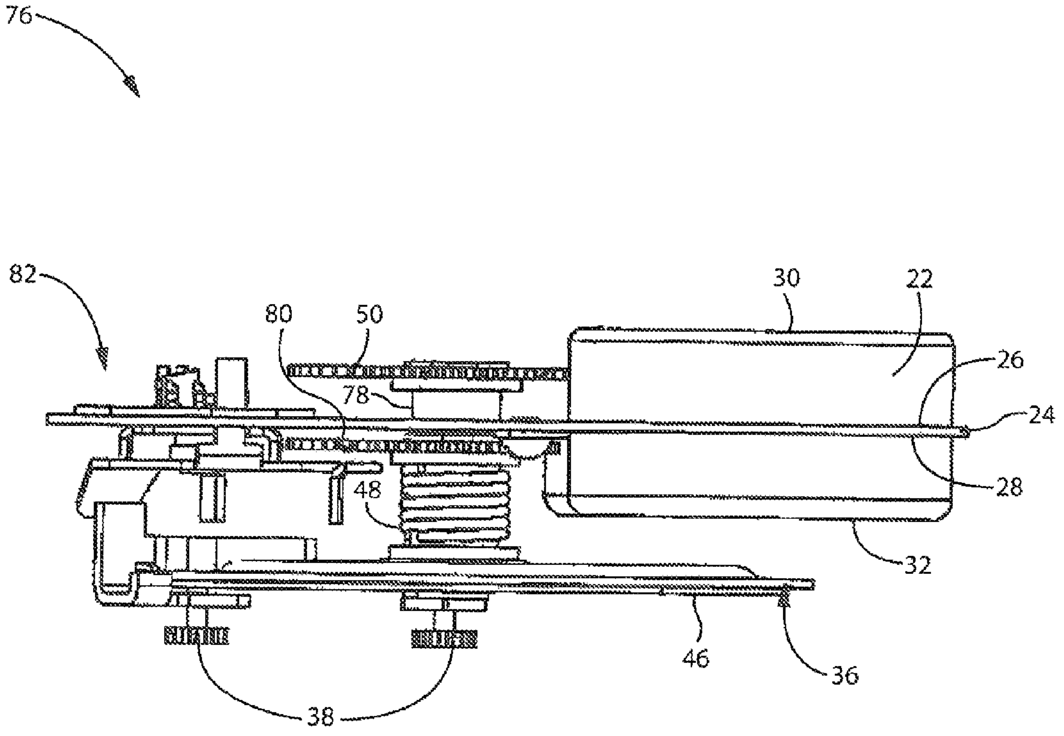
FIG. 15 is a top plan view of the timer assembly of FIG. 12.

As seen in FIG. 15, a secondary intermediate gear 80 may be incorporated to activate and deactivate the connected device through override switch 66 and other components known in the art. Alternatively, the secondary intermediate gear 80 may be omitted and the activating components may be located on the back side 26 of the baseplate 24 without departing from the spirit and scope of the present disclosure. Regardless of whether the secondary intermediate gear 80 is included, the shaft 78 extends through the shaft aperture 84 in the baseplate 24 when the intermediate gear 50 is positioned on the back side 26.

Referring to FIGS. 11 through 15, the motor 22 is again mounted to the baseplate 24 with the motor mounting screws 58 through the motor mounting openings 56 in the motor mounting tabs 52. The motor 22 may be mounted to the baseplate 24 at any suitable depth within opening 42 so long as the output gear 34 is engaged with the intermediate gear 50 and the motor 22 does not interfere with the operation of the time indicator 36. Specifically, the motor back end 32 does not extend forward of the baseplate front side 28 more than a back side of the time wheel 46 or the time indicator 36. Since the time indicator 36 extends rearward of the time wheel 46, the time indicator 36 tends to define the maximum distance that motor 22 can extend beyond the baseplate 24. In this arrangement, the motor output gear 34 is positioned on an opposite side of the baseplate 24 from the time indicator 36. Positioning the motor 22 to be within the space between the baseplate front side 28 and the back of time wheel 46 takes advantage of the thickness of the device which is otherwise wasted. In alternative arrangements, the motor 22 may be in a position that does not interfere with the time wheel 46 or the time indicator 36 and may therefore be positioned as far forward from the baseplate 24 as a front side of the time wheel 46. Accordingly, the timer assembly 76 is significantly reduced in thickness or depth by utilizing this otherwise wasted space.

In additional embodiments, the motor mounting screws 58 may be secured through the motor mounting tab openings 64 in baseplate 24 before being threaded into the motor mounting openings 56 in the motor mounting tabs 52. Alternatively, the motor mounting screws 58 may be secured through the motor mounting openings 56 in the motor mounting tabs 52 before being threaded into motor mounting tab openings 64 in the baseplate 24. The motor 22 may also be secured to the baseplate 24 by utilizing nuts to secure the motor mounting screws 58 instead of providing threaded holes at the motor mounting tab openings 64 or the motor mounting openings 56.

In operation, the motor 22 operates the time indicator 36 through the motor output gear 34 and may use the intermediate gear 50 as appropriate. As is customary with known mechanical timers, when the timer triggers 38 contact an actuating mechanism 82, the connected device is either turned on or off by supplying or shutting off current through the wiring terminals 68 as appropriate. Still further, the manual override switch 66 moves to the on or off position, but the manual override switch 66 is still operable to override the actuating mechanism 82.

Advantageously, the general operation and function of the timer assembly 20 and 76 are similar to known mechanical timers with the advantage of requiring significantly less space. Accordingly, the timer assemblies 20 and 76 provide a significantly thinner profile and less overall thickness of the timer assemblies by, amongst other advantages, incorporating the motor 22 within the baseplate 24. Additional advantages may include positioning the motor 22 within an area defined by the baseplate 24 and the time indicator 36, or by mounting the motor 22 in an offset manner with respect to the baseplate 24. Further, the orientation of the motor 22 may be changed to mount the motor to the front or the rear to provide for an additional thickness reduction.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A mechanical timer assembly comprising:

a single baseplate having a front side and a back side, wherein the baseplate includes a motor mounting opening and an output gear opening spaced from the motor mounting opening, wherein the baseplate is configured such that the front side of the baseplate lies in a first plane at the motor mounting opening and the back side of the baseplate lies in a second plane at the motor mounting opening, and wherein the motor mounting opening and the output gear opening open onto the front side and the back side of the baseplate;

a time indicator carried by the baseplate and located on the front side of the baseplate and exposed to an environment so that the time indicator is visible in a direction looking toward the front side of the baseplate;

a motor comprising a motor housing having a first portion, a second portion and an output gear mounting portion extending laterally from the first and second portions, wherein an output gear extends from the output gear mounting portion of the motor housing;

wherein the motor housing is secured to the baseplate and is positioned such that the output gear mounting portion of the motor housing extends laterally from the motor mounting opening, and wherein the motor housing is further positioned relative to the baseplate such that one of the first and second portions of the motor housing extends from the motor mounting opening in a forward direction and is located forwardly of and extends outwardly from the first plane defined by the front side of the baseplate at the motor mounting opening on the same side of the baseplate as the time indicator, and the other of the first and second portions of the motor housing extends from the motor mounting opening in a rearward direction and is located rearwardly of and extends outwardly from the second plane defined by the back side of the baseplate at the motor mounting opening; and wherein the output gear extends through the output gear opening and is drivingly engaged with the time indicator.

2. The mechanical timer assembly of claim 1 wherein the baseplate further comprises motor mounting tab openings, wherein the motor mounting tab openings are positioned in the baseplate.

3. The mechanical timer assembly of claim 1 wherein at least one intermediate gear is engaged with the time indicator and the output gear.

4. The mechanical timer assembly of claim 1 wherein one of the motor housing first and second portions is located outwardly of the output gear.

5. The mechanical timer assembly of claim 1 wherein one of the motor housing first and second portions extends forwardly from the front side of the baseplate a greater distance than the other of the motor housing first and second portions extends rearwardly from the back side of the baseplate.

6. The mechanical timer assembly of claim 1 wherein one of the motor housing first and second portions extends forwardly from the front side of the baseplate a distance less than the other of the motor housing first and second portions extends rearwardly from the back side of the baseplate.

7. The mechanical timer assembly of claim 1 wherein the time indicator is positioned on an opposite side of the baseplate from the motor output gear.

8. The mechanical timer assembly of claim 1 wherein the motor is releasably secured to the baseplate.

9. The mechanical timer assembly of claim 8 wherein the motor further comprises a wiring quick disconnect.

10. The mechanical timer assembly of claim 1 wherein the motor housing portion that extends forwardly of the front side of the baseplate does not extend forwardly from the front side of the baseplate a distance greater than the time indicator.

11. The mechanical timer assembly of claim 1 wherein at least 25 percent of a motor housing thickness extends beyond the front side of the baseplate.

12. The mechanical timer assembly of claim 1 wherein at least 50 percent of a motor housing thickness extends beyond the front side of the baseplate.

13. The mechanical timer assembly of claim 1 wherein the motor further comprises at least one mounting tab to secure the motor to the baseplate.

14. The mechanical timer assembly of claim 13 wherein the at least one mounting tab is a plurality of mounting tabs.

15. The mechanical timer assembly of claim 13 wherein the at least one mounting tab is positioned between the motor housing first and second portions.

16. The mechanical timer assembly of claim 15 wherein the at least one mounting tab is positioned at a midpoint defined by the first and second motor housing portions.

17. A mechanical timer assembly comprising:

a single baseplate having a front side and a back side, wherein the baseplate includes a motor mounting opening, an output gear opening spaced from the motor mounting opening, and a drive arrangement opening spaced from the motor mounting opening and output gear opening, wherein the baseplate is configured such that the front side of baseplate lies in a first plane at the motor mounting opening and the back side of the baseplate lies in a second plane at the motor mounting opening, and wherein the motor mounting opening, the output gear opening, and drive arrangement opening open onto the front side and the back side of the baseplate;

a time indicator carried by the baseplate and located forwardly on the front side of the baseplate and exposed to an environment so that the time indicator is visible in a direction looking toward the front side of the baseplate;

a motor comprising a motor housing having a first portion, a second portion and an output gear mounting portion extending laterally from the first and second portions, wherein an output gear extends from the output gear mounting portion of the motor housing; and a drive arrangement that extends through the drive arrangement opening, wherein the drive arrangement is drivingly engaged with the time indicator and wherein the motor output gear is drivingly engaged with the drive arrangement;

wherein the motor housing is secured to the baseplate and is positioned such that the output gear mounting portion of the motor housing extends laterally from the motor mounting opening, and wherein the motor housing is further positioned relative to the baseplate such that one of the first and second portions of the motor housing extends from the motor mounting opening in a forward direction and is located forwardly of and extends outwardly from the first plane defined by the front side of the baseplate at the motor mounting opening on the same side of the baseplate as the time indicator, and the other of the first and second portions of the motor housing extends from the motor mounting opening in a rearward direction and is located rearwardly of and extends outwardly from the second plane defined by the back side of the baseplate at the motor mounting opening;

wherein the output gear extends through the output gear opening; and wherein one of the motor housing first and second portions extending in the same direction as the output gear extends outwardly beyond the output gear.

18. The mechanical timer assembly of claim 17 wherein the baseplate further comprises motor mounting tab openings, wherein the motor mounting tab openings are positioned in the baseplate and wherein the motor further comprises at least one mounting tab to secure the motor to the motor mounting tab openings.

19. The mechanical timer assembly of claim 17 wherein the time indicator is positioned on an opposite side of the baseplate from the motor output gear.

20. The mechanical timer assembly of claim 17 wherein the motor housing portion that extends forwardly of the front side of the baseplate does not extend outwardly beyond the time indicator.

21. The mechanical timer assembly of claim 17 wherein at least 25 percent of a motor thickness extends beyond the front side of the baseplate.

22. The mechanical timer assembly of claim 17 wherein the motor further comprises at least one mounting tab positioned between the motor housing first and second portions.

23. The mechanical timer assembly of claim 22 wherein the at least one mounting tab is positioned at a midpoint defined by the first and second motor housing portions.

* * * * *